United States Patent [19]

Belke

[11] E Re. 30,487

[45] Reissued Jan. 20, 1981

[54] LANDING GEAR CONSTRUCTION

[75] Inventor: Jack T. Belke, Grand Rapids, Mich.

[73] Assignee: Westran Corporation, Muskegon, Mich.

[21] Appl. No.: 877,564

[22] Filed: Feb. 13, 1978

Related U.S. Patent Documents

Reissue of:

[64] Patent No.: 4,004,830
Issued: Jan. 25, 1977
Appl. No.: 599,051
Filed: Jul. 25, 1975

[51] Int. Cl.[2] ..... B60S 9/02

[52] U.S. Cl. ..... 280/763; 280/766

[58] Field of Search ..... 280/763, 766; 308/2 R, 308/35; 254/86 R, 86 H; 29/516, 149.5 R; 248/357; 301/5.3

[56] References Cited

U.S. PATENT DOCUMENTS

| | | | |
|---|---|---|---|
| 1,345,848 | 7/1920 | Hardy | 301/5.3 |
| 1,515,683 | 11/1924 | Jones | 308/35 |
| 2,638,664 | 5/1953 | Maxson | 29/149.5 R |
| 2,666,677 | 1/1954 | Miller | 29/516 |
| 3,197,235 | 7/1965 | Chieger | 280/763 |
| 3,880,403 | 4/1975 | Glassmeyer | 280/150.5 |
| 3,920,094 | 11/1975 | Claffin | 254/86 H |

*Primary Examiner*—Robert R. Song

*Attorney, Agent, or Firm*—Gifford, VanOphem, Sheridan & Sprinkle

[57] ABSTRACT

In a trailer landing gear assembly having a housing secured to a trailer and a foot adapted to engage the ground, attachment means for attaching an extension-retraction assembly to both the housing and the landing gear foot by respectively deforming the landing gear housing and the landing gear foot so that the deformations created support the axial load between the extension-retraction assembly and the landing gear. An axle secured to the downwardly depending end of the extension-retraction assembly is rotatably received in a pair of registering apertures formed in the landing gear foot. Each aperture in the landing gear foot is deformed to form a cylindrical portion coaxial with the aperture and integral with the foot so that the cylindrical portion supports the vertical load between the landing gear foot and the extension-retraction assembly. Similarly a gear base plate forms the attachment means between the upper end of the extension-retraction assembly and the landing gear housing. The gear base plate is received within the housing and includes a flange portion adjacent the interior of the housing. The housing is indented around the flange portion of the gear base plate so that the inward projections formed by the indentations overlap and secure the base plate flange portion to the housing. The projections then function to support the vertical load between the extension-retraction assembly and the landing gear housing.

8 Claims, 4 Drawing Figures

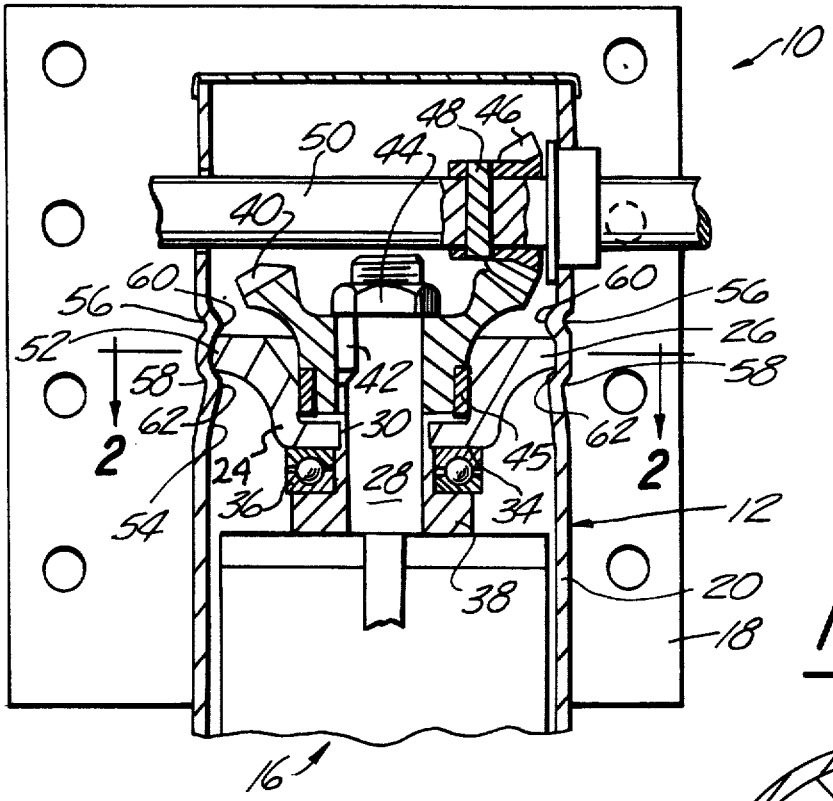
Fig-1
Fig-2
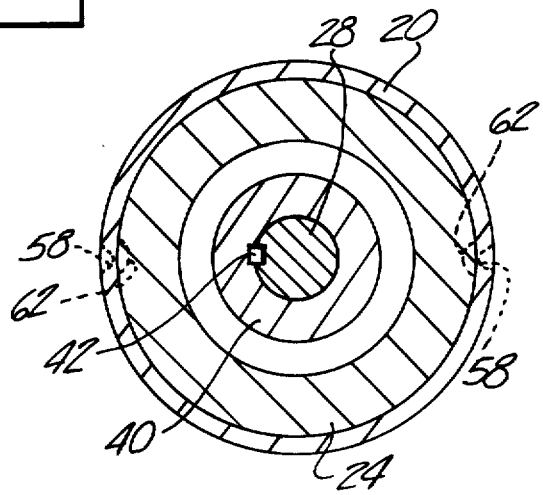
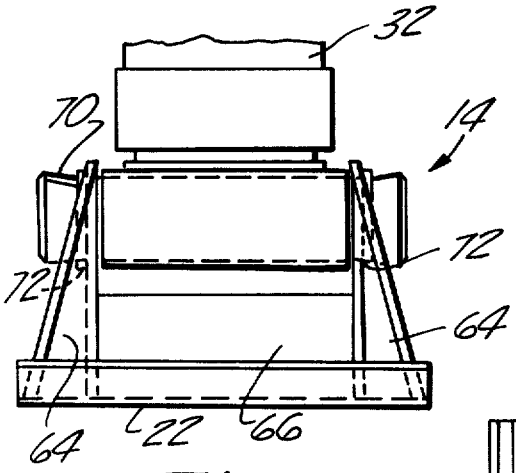
Fig-3
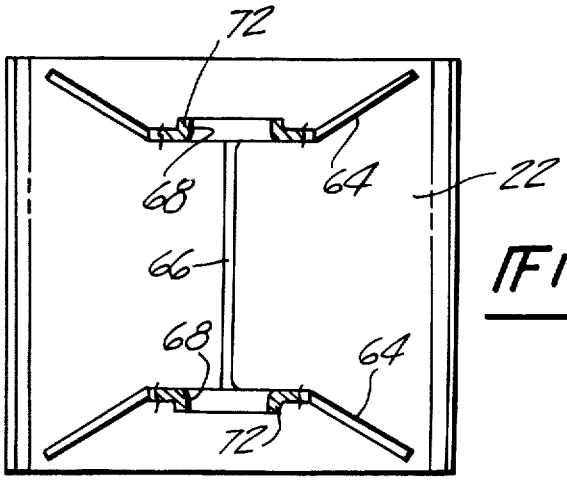
Fig-4

LANDING GEAR CONSTRUCTION

Matter enclosed in heavy brackets [ ] appears in the original patent but forms no part of this reissue specification; matter printed in italics indicates the additions made by reissue.

BACKGROUND OF THE INVENTION

I. Field of the Invention

The present invention relates generally to a trailer landing gear construction and more particularly to an attachment and support means to support the vertical load between the landing gear housing and the landing gear foot.

II. Description of the Prior Art

The conventional landing gear assemblies comprise three discrete assemblies, namely a landing gear housing, an extension-retraction assembly (hereinafter for brevity, referred to as the extension assembly) and a landing gear foot. The landing gear housing comprises a generally vertical and cylindrical tube which is attached to the trailer body while the landing gear foot is adapted to engage the ground. The extension assembly, disposed intermediate and secured to the landing gear foot and the landing gear housing, may take any of several forms and functions to vertically extend or retract the landing gear foot relative to the landing gear housing.

In the previously known landing gear assemblies an axle carried at the lower depending end of the extension assembly is rotatably received within pair of registering apertures formed through the landing gear foot. Since the connection between the landing gear foot and the axle of the extension assembly must necessarily be able to withstand great vertical loads, it has been the practice with the previously known landing gear assemblies to weld a support plate over each aperture in the landing gear foot. The support plate, of course, includes an aperture which registers with the aperture in the landing gear foot and in essence serves to increase the axial length of the landing gear foot aperture thus increasing the support between the landing gear foot and the extension assembly. The major disadvantage of this previously known construction for the landing gear foot is that the weld between the support plate and the landing gear foot has been known to crack thereby reducing the effectiveness of the support plate and subjecting the landing gear foot to excessive vertical loads.

A further disadvantage of the previously known landing gear foot with support plates is that the support plates are relatively expensive to fabricate particularly in view of rising metal prices. In addition expensive welding equipment is required and high labor costs are incurred in securing the support plates to the landing gear foot.

Similarly, in order to attach the upper end of the extension assembly to the landing gear housing, a gear base plate is typically provided on the upper end of the extension assembly and is slidably received within the landing gear housing. The previously known gear base plates included a cylindrical portion having an outer diameter substantially the same as the inner diameter of the landing gear housing so that the cylindrical portion abuts the inside surface of the landing gear housing. In the previously known landing gear assemblies the cylindrical portion is then welded to the landing gear housing in order to attach the upper end of the extension assembly to the housing. Like the attachment between the extension assembly and the landing gear foot, the welds between the gear base plate and the housing are prone to crack thereby subjecting the attachment between the extension assembly and the housing to excessive stress. Also the welding operation between the gear base plate and the landing gear housing has proven to be unduly time consuming thus increasing the labor costs for the construction of the entire landing gear assembly.

SUMMARY OF THE PRESENT INVENTION

The landing gear construction of the present invention obviates the above mentioned disadvantages of the previously known landing gear constructions by deforming the landing gear at the point of [attachement] *attachment* between the extension assembly and the landing gear housing and foot so that the deformation created bears the vertical load between the landing gear housing or foot and the extension assembly.

The landing gear deformations of the present invention eliminate the previously required welds between the extension assembly and the landing gear housing and foot thereby eliminating the possibility of cracked welds. Moreover, it has been found that the metal deformations of the present invention are much less expensive, both in material and labor costs, than the weld attachment means of the previously known landing gears.

For the attachment between the lower depending end of the extension assembly and the landing gear foot, the landing gear foot of the present invention is provided with a pair of registering apertures adapted to receive an axle secured to the extension assembly similar to the previously known landing gear extension assemblies. However, instead of attaching the previously known support plate to the landing gear foot, each aperture of the landing gear foot is deformed thus forming a cylindrical portion around and coaxial with each aperture and integral with the landing gear foot. The cylindrical portions of the present invention serve to increase the axial length of the apertures, like the previously known support plates, so that the cylindrical portions support the vertical load from the trailer between the extension assembly and the landing gear foot.

For the attachment between the upper end of the extension assembly and the landing gear housing, the gear base plate of the extension assembly is slidably received within the landing gear housing and includes a radial flange which abuts against the interior of the housing. With the gear base plate in its proper longitudinal position with the housing, the housing is indented around the base plate flange thereby forming inwardly facing projections which overlap the flange of the gear base plate and prevent further longitudinal movement of the gear base plate relative to the landing gear housing. [Preferably] *At least* a pair of projections, one projection above and one projection below the base flange, are formed in the landing gear housing and preferably at least two pairs of projections are formed in the housing to secure the gear base plate to the housing. Thus with a vertical load on the landing gear assembly, the projections support the vertical load from the trailer between the extension assembly and the landing gear housing. Like the attachment between the extension assembly and the landing gear foot, the present invention not only eliminates the possibility of cracked welds but also has proven to be a less expensive landing gear construction than previously known landing gear constructions.

BRIEF DESCRIPTION OF THE DRAWINGS

The landing gear construction of the present invention will be more clearly understood by reference to the following detailed description when read in conjunction with the accompanying drawing, wherein like reference characters refer to like parts throughout the several views and in which:

FIG. 1 is a cross sectional view of the landing gear construction of the present invention with parts removed for clarity;

FIG. 2 is a cross sectional view taken substantially along line 2—2 in FIG. 1; and FIG. 3 is a fragmentary side plan view of the landing gear foot of the present invention; and FIG. 4 is a top plan view of the landing gear foot of the present invention with parts shown in section for clarity.

DETAILED DESCRIPTION OF THE PRESENT INVENTION

Referring particularly to FIG. 1, a landing gear assembly 10 is shown as comprising a housing assembly 12, a landing gear foot 14, and an extension assembly 16 connecting the landing gear housing assembly 12 to the landing gear foot 14. The landing gear housing assembly 12 comprises a generally cylindrical housing 20 secured to attachment means, such as a plate 18, for securing the housing assembly 12 to a trailer (not shown). The landing gear foot 14 includes a base plate 22 [adapated] *adapted* to engage the ground while the extension assembly 16 connects the landing gear foot 14 to the housing 20 and is operable to variably vertically extend or retract the landing gear foot 14 relative to the housing 20.

The extension assembly 16 may be of any conventional construction. However, in the construction shown in FIG. 1, the extension assembly 16 includes a cup-shaped gear base plate 24 having an upper radial flange 26 secured to the housing 20 in a manner to be hereinafter described in greater detail. A vertical shaft 28 is rotatably received through an aperture 30 in the base plate 24 and rotation of the shaft 28 selectively vertically extends or retracts a tube 32, depending upon the direction of rotation, in a conventional manner. The bottom 34 of the base plate 24 serves as an abutment surface for a thrust bearing 36 which in turn abuts a collar 38 secured to the shaft 28. It can thus be seen that the gear base plate 24 prevents vertical axial movement of the shaft 28 relative to the housing 20 while the thrust bearing 36 permits rotation of the shaft 28 despite an axial load on the shaft 28.

In order to produce rotary movement of the shaft 28, a bevel gear 40 is secured against rotation to the shaft 28 above the gear base plate 24 in any conventional manner such as a key 42 and lock nut 44. In addition a bushing 45 is preferably provided between the gear base plate 24 and the bevel gear 40 to reduce friction between the gear 40 and the base plate 24. A pinion bevel 46 meshes with the bevel gear 40 and is secured by a roll pin 48 to a shaft 50. The axis of rotation for the shaft 50 is fixed relative to the landing gear housing assembly 12 and means (not shown) are provided so that the vehicle operator can rotate the shaft 50. Rotation of the shaft 50 effects rotation of the shaft 28 through gears 46 and 40 thus extending or retracting the tube 32, as previously described, in accordance with the direction of rotation of the shaft 50.

The gear base plate 24 forms the attachment element between the upper end of the extension assembly 16 and the landing gear housing assembly 12. The attachment means between the base plate 24 and the housing 20 can best described by reference to FIGS. 1 and 2. The flange 26 of the base plate 24 extends radially outward from the axis of the housing 20 so that the outer edge 52 of the flange 26 either abuts or lies closely adjacent the inner surface 54 of the housing 20. With the base plate 24 properly positioned axially within the housing 20, a first pair of indentations 56 and 58 are formed in the housing 20 by any conventional means, such as stamping, so that the indentation 56 forms an inwardly facing upper projection 60 above the base plate flange 26 while the lower indentation 58 forms a second inwardly facing lower projection 62 underneath the base plate flange 26. Similarly, a pair of indentations 56 and 58 and corresponding projections 60 and 62 are formed in the housing 20 at a positon diametrically opposed to the first pair of indentations. It should be understood, however, that additional pairs of indentations 56 and 58 may be formed around the housing 20 without deviating from the spirit or scope of the present invention.

With the landing gear in an operable position, i.e. with the landing gear foot 14 engaging the ground, the upper surface of the gear base plate flange 26 abuts against the projections 60 so that the vertical load between the extension assembly 16 and the housing 20 is supported entirely by the projections 60. Conversely with the landing gear foot 14 in a raised position, the lower surface of the base plate flange 26 abuts against the projections 62 thus preventing the extension assembly 16 from dropping downwardly in the housing 20. The projections 60 and 62 thus serve to securely attach the gear base plate 24, and hence the extension assembly 16, to the landing gear housing 20.

The attachment means of the present invention between the extension assembly 16 and the landing gear foot 14 may be most clearly understood by reference to FIGS. 3 and 4. A pair of spaced and substantially identical side plates 64 are secured to the upper surface of the base plate 22. A cross support 66 is preferably secured to both of the side plates 64 and the base plate 22 to provide additional support and rigidity for the landing gear foot 14. An aperture 68 is formed in each side plate 64 so that the apertures 68 register with each other and are adapted to receive an axle 70 carried by the tube 32 therethrough.

In order to provide additional support between the axle 70 and the side plate 64, each aperture 68 is deformed preferably by stamping, so that a cylindrical portion 72 integral with the side plate 64 is formed coaxially with each aperture 68.

Each cylindrical portion 72 serves to effectively increase the axial length of the aperture 68 so that the vertical load between the landing gear foot 14 and the extension assembly 16 is evenly distributed across the circular portion 72 thereby eliminating excessive stress between the landing foot 14 and extension means 16.

It can thus be seen that the present invention discloses a novel means for attachment and supporting the vertical load of the extension assembly between the landing gear housing 20 and the landing gear foot 14.

Many modifications of the present invention will become apparent to those skilled in the art to which it pertains without deviating from the spirit of the invention as defined by the scope of the appended claims.

What is claimed is:

1. In a trailer landing gear assembly having a generally cylindrical housing and means for securing said housing to said trailer, a landing gear foot adapted to engage the ground and an extension assembly having a gear base plate received in said housing and a downwardly depending axle adapted to be received in two registering apertures in said foot, said gear base plate having an annular flange adjacent to the inner surface of said housing, the improvement comprising vertical load supporting means formed in said housing for connecting said extension assembly to said housing and for connecting said foot to said housing, said means comprising at least two upper and two lower inwardly projecting projections integral with said housing, wherein said upper projections are positioned on said housing to abut against the upper surface of said gear base plate flange and said lower projections abut against the lower surface of said gear base plate flange whereby said [cylindrical portions and said] projections support the vertical load of said landing gear assembly between the extension assembly and the landing gear housing.

2. The assembly as defined in claim 1 and in which said improvement further comprises a cylindrical portion integral with said landing gear foot and disposed around and coaxial with each of said apertures in said landing gear foot.

3. In a trailer landing gear assembly having a generally cylindrical housing and means for securing said housing to said trailer, a landing gear foot adapted to engage the ground and an extension assembly having a gear base plate received in said housing and a downwardly depending axle adapted to be received in two registering apertures in said foot, said gear base plate having an annular flange adjacent to the inner surface of said housing, means for constructing the load supporting attachment between said extension assembly and said landing gear foot and housing, comprising a cylindrical portion integral with said landing gear foot and disposed around and coaxial with each of said apertures in said landing gear foot and at least two upper and two lower inwardly projecting projections integral with said housing for abuttingly confining said annular flange in said housing, said cylindrical portions formed by stamping portions of said landing gear foot around said apertures outwardly.

4. The assembly as defined in claim 3 wherein said upper projections are positioned on said housing to abut against the upper surface of said gear base plate flange and said lower projections abut against the lower surface of said gear base plate flange whereby said projections support the vertical load of said landing gear assembly between the extension assembly and the landing gear housing.

*5. In a trailer landing gear assembly having a tubular housing, means for securing said housing to said trailer, a landing gear foot adapted to engage the ground and an extension assembly having a gear base plate received in said housing and a downwardly depending axle adapted to be received in two registering apertures in said foot, said gear base plate having an annular flange adjacent to the inner surface of said housing, the improvement comprising vertical load supporting means formed in said housing for connecting said extension assembly to said housing and for connecting said foot to said housing, said means comprising at least two upper and two lower inwardly projecting projections integral with said housing, wherein said upper projections are positioned on said housing to abut against the upper surface of said gear base plate flange and said lower projections abut against the lower surface of said gear base plate flange whereby said projections support the vertical load of said landing gear assembly between the extension assembly and the landing gear housing.*

*6. The assembly as defined in claim 5 and in which said improvement further comprises a cylindrical portion integral with said landing gear foot and disposed around and coaxial with each of said apertures in said landing gear foot.*

*7. In a trailer landing gear assembly having a tubular housing and means for securing said housing to said trailer, a landing gear foot adapted to engage the ground and an extension assembly having a gear base plate received in said housing and a downwardly depending axle adapted to be received in two registering apertures in said foot, said gear base plate having an annular flange adjacent to the inner surface of said housing, means for constructing the load supporting attachment between said extension assembly and said landing gear foot and housing, comprising a cylindrical portion integral with said landing gear foot and disposed around and coaxial with each of said apertures in said landing gear foot and at least two upper and two lower inwardly projecting projections integral with said housing for abuttingly confining said annular flange in said housing, said cylindrical portions formed by stamping portions of said landing gear foot around said apertures outwardly.*

*8. The assembly as defined in claim 7 wherein said upper projections are positioned on said housing to abut against the upper surface of said gear base plate flange and said lower projections abut against the lower surface of said gear base plate flange whereby said projections support the vertical load of said landing gear assembly between the extension assembly and the landing gear housing.*

* * * * *

UNITED STATES PATENT AND TRADEMARK OFFICE

CERTIFICATE OF CORRECTION

PATENT NO. : 30,487

DATED : January 20, 1981

INVENTOR(S) : Jack T. Belke

It is certified that error appears in the above-identified patent and that said Letters Patent are hereby corrected as shown below:

Column 4, line 7, after "best" insert --be--.

Signed and Sealed this

Ninth Day of June 1981

[SEAL]

*Attest:*

RENE D. TEGTMEYER

*Attesting Officer* *Acting Commissioner of Patents and Trademarks*